United States Patent
Guo et al.

(10) Patent No.: US 9,730,124 B2
(45) Date of Patent: Aug. 8, 2017

(54) METHOD FOR ACQUIRING UE CAPABILITY, TERMINAL, AND BASE STATION

(71) Applicant: Huawei Technologies Co., Ltd., Shenzhen (CN)

(72) Inventors: Yi Guo, Shanghai (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/874,341

(22) Filed: Oct. 2, 2015

(65) Prior Publication Data

US 2016/0029275 A1    Jan. 28, 2016

Related U.S. Application Data

(63) Continuation of application No. PCT/CN2013/073695, filed on Apr. 3, 2013.

(51) Int. Cl.
*H04W 36/00* (2009.01)
*H04W 36/14* (2009.01)
(Continued)

(52) U.S. Cl.
CPC .............. *H04W 36/14* (2013.01); *H04W 8/22* (2013.01); *H04W 36/0016* (2013.01);
(Continued)

(58) Field of Classification Search
CPC . H04W 88/02; H04W 88/08; H04W 36/0033; H04W 36/14; H04W 8/24;
(Continued)

(56) References Cited

U.S. PATENT DOCUMENTS

| 6,081,534 A * | 6/2000 | Sipila | H04W 88/181 |
| | | | 370/466 |
| 6,954,634 B1 * | 10/2005 | Bucknell | H04W 8/24 |
| | | | 370/252 |

(Continued)

FOREIGN PATENT DOCUMENTS

| CN | 1571355 | 1/2005 |
| CN | 101179858 | 5/2008 |

(Continued)

OTHER PUBLICATIONS

"3rd Generation Partnership Project; Technical Specification Group Radio Access Network; Evolved Universal Terrestrial Radio Access (E-UTRA); User Equipment (UE) radio access capabilities (Release 11)," 3GPP TS 36.306 V11.3.0, Mar. 2013, 28 pages.

(Continued)

*Primary Examiner* — Mahendra Patel
(74) *Attorney, Agent, or Firm* — Slater Matsil, LLP (57) ABSTRACT

Embodiments of the present invention provide a method for acquiring a UE capability, a terminal, and a base station. A method for acquiring a UE capability includes: receiving, by a target base station, a handover request sent by a core network device or a source base station, where the handover request carries first UE capability information; and if the first UE capability information indicates an incomplete capability of a UE, after the UE is handed over to the target base station, the target base station determines, according to the first UE capability information, whether to acquire a complete capability of the UE.

17 Claims, 7 Drawing Sheets

---

A target base station receives first UE capability information sent by a core network device or a source base station —— 110

If the first UE capability information indicates an incomplete capability of a UE, after the UE is handed over to the target base station, the target base station determines, according to the first UE capability information, whether to acquire a complete capability of the UE —— 120

(51) Int. Cl.
*H04W 8/22* (2009.01)
*H04W 74/08* (2009.01)
*H04W 88/02* (2009.01)
*H04W 88/08* (2009.01)

(52) U.S. Cl.
CPC ... *H04W 36/0055* (2013.01); *H04W 74/0833* (2013.01); *H04W 36/0033* (2013.01); *H04W 88/02* (2013.01); *H04W 88/08* (2013.01)

(58) Field of Classification Search
CPC .............. H04W 8/22; H04W 36/0016; H04W 36/0055; H04W 74/0833; H04W 36/0044; H04W 36/0022; H04W 88/181; H04B 6/0617; H04B 7/2659; H04L 25/03891; H04L 69/24
USPC .......................................... 455/436; 370/449
See application file for complete search history.

(56) References Cited

U.S. PATENT DOCUMENTS

| | | | | |
|---|---|---|---|---|
| 9,055,491 | B2* | 6/2015 | Jung | H04W 36/0072 |
| 2003/0022654 | A1* | 1/2003 | Kakani | H04L 1/1874 455/403 |
| 2006/0250996 | A1 | 11/2006 | Mella et al. | |
| 2007/0153742 | A1* | 7/2007 | Sebire | H04L 47/10 370/331 |
| 2007/0291695 | A1* | 12/2007 | Sammour | H04W 36/02 370/331 |
| 2008/0025263 | A1* | 1/2008 | Pelkonen | H04W 36/0066 370/332 |
| 2008/0254800 | A1* | 10/2008 | Chun | H04W 48/12 455/438 |
| 2008/0305825 | A1* | 12/2008 | Shaheen | H04W 8/24 455/552.1 |
| 2009/0011783 | A1* | 1/2009 | Kitazoe | H04W 8/22 455/517 |
| 2010/0002655 | A1 | 1/2010 | Ofuji et al. | |
| 2010/0034094 | A1* | 2/2010 | Tenny | H04W 8/22 370/241 |
| 2010/0103901 | A1 | 4/2010 | Miki et al. | |
| 2010/0142488 | A1* | 6/2010 | Zhang | H04W 36/0022 370/332 |
| 2010/0330959 | A1* | 12/2010 | Mildh | H04W 8/22 455/410 |
| 2013/0322302 | A1* | 12/2013 | Gholmieh | H04W 36/24 370/280 |
| 2015/0334636 | A1 | 11/2015 | Maeda et al. | |

FOREIGN PATENT DOCUMENTS

| | | |
|---|---|---|
| CN | 101272621 | 9/2008 |
| KR | 1020080080803 A | 9/2008 |
| KR | 1020090130392 A | 12/2009 |
| KR | 1020100086497 A | 7/2010 |
| RU | 2405270 C2 | 11/2010 |
| RU | 2434335 C2 | 11/2011 |
| RU | 2450456 C2 | 5/2012 |
| RU | 2461149 C1 | 9/2012 |
| WO | 2008114183 A1 | 9/2008 |
| WO | 2009072956 A1 | 6/2009 |
| WO | 2012152085 A1 | 11/2012 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.311 V11.3.0, Mar. 2013, 344 pages.
"LS on KENB Re-keying without a Change of KASME," 3GPP TSG Ran WG2 Meeting #80, R2-125837, Nov. 12-16, 2012, New Orleans, USA, 2 pages.
"Provisioning of E-UTRS Radio Capabilities in Geran," 3PP TSG Geran WG2 Metting #57, GP-130258, Feb. 26-28, 2013, Vienna, Austria, 2 pages.
3GPP TSG CT WG1: "Reply LS on Size of E-UTRA Radio Capabilities", 3GPP TSG CT WG1 Meeting#82, C1-130842, Jan. 28-Feb. 1, 2013, 1 page, Mexico.
Telefon AB LM Ericsson et al., "BSS Derived Information for CS to PS rSRVCC", 3GPP TSG GERAN#57, GP-130165, Feb. 25-Mar. 1, 2013, 9 pages, Vienna, Austria.
Nokia Siemens Networks, "Discussion on the Transfer of UE EUTRA Capabilities for rSRVCC From GERAN to E-UTRAN", 3GPP TSG GERAN#57, GP-130201, Feb. 25-Mar. 1, 2013, 3 pages, Vienna, Austria.
GERAN2, "(Draft) Provisioning of E-UTRA Radio Capabilities in GERAN", 3GPP TSG GERAN WG2 Meeting #57, GP-130223, Feb. 26-28, 2013, 2 pages, Vienna Austria.
Ericsson et al., "Transfer of Large Size UE EUTRA Capabilities", 3GPP TSG-RAN WG2 #81, R2-130569, Jan. 28 to Feb. 1, 2013, 4 pages, St. Julian's, Malta.
3GPP TSG CT WG1: "Reply LS on Size of E-UTRA Radio Capabilities," 3GPP TSG CT WG1 Meeting #82, C1-130842, Jan. 28-Feb. 1, 2013, 1 page.
"3rd Generation Partnership Project; Technical Specification Group Core Network and Terminals; Mobile radio interface Layer 3 specification; Core network protocols; Stage 3 (Release 12)", 3GPP TS 24.008 V12.1.0, Mar. 2013, 679 pages.
"3rd Generation Partnership Project; Technical Specification Group Core Network and Terminals; Non-Access-Stratum (NAS) Protocol for Evolved Packet System (EPS); Stage 3 (Release 12)", 3GPP TS 24.301 V12.0.0, Mar. 2013, 345 pages.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, 344 pages.
"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36,413 V11.3.0, Mar. 2013, 274 pages.
"3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (Rlc/Mac) protocol (Release 11)", 3GPP TS 44.060 V11.4.0, Mar. 2013, 630 pages.
3 "rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 11)", 3GPP TS 48.018'11.2.0, Mar. 2013, 187 pages.
Huawei, Hisilicon, "Consideration on Dual Mode UE (FDD&TDD) Capability Handling", Agenda item 6.6, 3GPP TSG-RAN WG2 Meeting #77; R2-120063, Dresden, Germany, Feb. 6-10, 2012; 4 pages.

* cited by examiner

METHOD FOR ACQUIRING UE CAPABILITY, TERMINAL, AND BASE STATION

This application is a continuation of International Application No. PCT/CN2013/073695, filed on Apr. 3, 2013, which is hereby incorporated by reference in its entirety.

TECHNICAL FIELD

The present invention relates generally to a system and method ~~~, and, in particular embodiments, to a system and method for.

BACKGROUND

A radio access technology of a wireless cellular mobile network is developing continuously, aiming to meet a user requirement for a higher rate, a wider coverage, and a larger capacity in the future. A current radio access technology is evolving from a "3G" system into Long Term Evolution (LTE), and further evolves into a "LTE-Advanced" system. In a process in which some user equipments (UE) that support a handover from a base station of a GERAN system to a base station of an LTE system perform an inter-system handover, a UE capability needs to be transferred to the base station of the LTE system by using the base station of the GSM/EDGE radio access network (GERAN) system, and the base station of the LTE system determines, according to the UE capability, how to allocate resources to the user equipments.

In the prior art, because a PS domain of the GERAN system can transmit only an information element of a maximum of 255 bytes, and a CS domain can transmit only an information element of a maximum of 251 bytes. However, a size of a UE capability of the LTE may exceed the 255 bytes, and the UE capability cannot be transmitted in the GERAN system. Therefore, in a handover process, UE capability information received by a target base station may be incomplete, and the target base station cannot determine whether the received UE capability information is complete, and after the handover is completed, the target base station obtains the UE capability information from a UE again regardless of whether complete UE capability information is obtained. Therefore, this method may result in a large number of unnecessary signaling overheads, and a heavy burden on the system.

SUMMARY

Embodiments of the present invention provide a method for acquiring a UE capability, a terminal, and a base station, which implement that in a handover process, a target base station may determine whether received UE capability information is complete, and determine, according to first UE capability information, whether to acquire a complete capability of a UE.

According to a first aspect, an embodiment of the present invention provides a method for acquiring a user equipment UE capability, including: receiving, by a target base station, first UE capability information sent by a core network device or a source base station; and determining, if the first UE capability information indicates an incomplete capability of a UE, after the UE is handed over to the target base station, by the target base station according to the first UE capability information, whether to acquire a complete capability of the UE.

In a first possible implementation manner of the first aspect, the determining, if the first UE capability information indicates an incomplete capability of a UE, after the UE is handed over to the target base station, by the target base station according to the first UE capability information, whether to acquire a complete capability of the UE includes if the first UE capability information indicates the incomplete capability of the UE, after the UE is handed over to the target base station, receiving, by the target base station, second UE capability information sent by the UE, where the second UE capability information indicates the complete capability of the UE.

According to the first aspect or the first possible implementation manner of the first aspect, in a second possible implementation manner, including the first UE capability information is carried in a handover request that is sent by the core network device or the source base station and received by the target base station.

According to the second possible implementation manner of the first aspect, in a third possible implementation manner of the first aspect, the first UE capability information includes indication information, and the indication information is used to indicate whether the first UE capability information indicates the incomplete capability of the UE; or the handover request carries first indication information, and the first indication information is used to indicate whether the first UE capability information indicates the incomplete capability of the UE.

According to the second possible implementation manner of the first aspect, in a fourth possible implementation manner, the handover request carries release information of the UE; and after the target base station receives the handover request sent by the core network device or the source base station, the method further includes determining, by the target base station according to the release information, whether the first UE capability information indicates the incomplete capability of the UE.

According to the fourth possible implementation manner of the first aspect, in a fifth possible implementation manner, the determining, by the target base station according to the release information, whether the first UE capability information indicates the incomplete capability of the UE is specifically: if the target base station determines that the release information is later than or the same as a set release, determining, by the target base station, that the first UE capability information indicates the incomplete capability of the UE; or if the target base station determines that the release information is earlier than a set release, determining, by the target base station, that the first UE capability information indicates the complete capability of the UE.

According to the second possible implementation manner of the first aspect, in a sixth possible implementation manner, after the target base station receives the handover request sent by the core network device or the source base station, the method further includes receiving, by the target base station, second indication information that is sent by the UE and used to indicate whether the first UE capability information indicates the incomplete capability of the UE.

According to a second aspect, an embodiment of the present invention provides a method for acquiring a user equipment UE capability, including: sending, by a UE, first UE capability information to a core network device; and if the first UE capability information indicates an incomplete capability of the UE, after the UE is handed over to a target base station, receiving, by the UE, a capability enquiry request message sent by the target base station.

According to a first possible implementation manner of the second aspect, the method further includes: sending, by the UE, second UE capability information to the target base station, where the second UE capability information indicates a complete capability of the UE.

According to the second aspect or the first possible implementation manner of the second aspect, in a second possible implementation manner, including the first UE capability information is carried in an Attach Request or a Routing Area Update Request sent by the UE to the core network device, or the first UE capability information is carried in Attach Complete or Routing Area Update Complete sent by the UE to the core network device.

According to the second aspect, any one of the first to the second possible implementation manner of the second aspect, in a third possible implementation manner, the first UE capability information includes indication information, and the indication information is used to indicate whether the first UE capability information indicates the incomplete capability of the UE; or the Attach Complete or the Routing Area Update Complete carries third indication information, and the third indication information is used to indicate whether the first UE capability information indicates the incomplete capability of the UE.

According to the second possible implementation manner of the second aspect, in a fourth possible implementation manner, after the UE sends the Attach Complete or the Routing Area Update Complete to the core network device, the method includes sending, by the UE to the target base station, second indication information that is used to indicate whether the first UE capability information indicates the incomplete capability of the UE, where the second indication information is carried in a handover complete message or a random access request message that is sent by the UE and received by the target base station.

According to a third aspect, an embodiment of the present invention provides a base station, including: a receiver, configured to receive first UE capability information sent by a core network device or a source base station; and a transmitter, configured to: if the first UE capability information indicates an incomplete capability of a UE, after the UE is handed over to a target base station, determine, according to the first UE capability information, whether to acquire a complete capability of the UE.

In a first possible implementation manner of the third aspect, the receiver is further configured to: if the first UE capability information indicates the incomplete capability of the UE, after the UE is handed over to the target base station, receive second UE capability information sent by the UE, and the second UE capability information indicates the complete capability of the UE.

According to the third aspect or the first possible implementation manner, in a second possible implementation manner, including the first UE capability information is carried in a handover request that is sent by the core network device or the source base station and received by the target base station.

According to the second possible implementation manner of the third aspect, in a third possible implementation manner, the first UE capability information includes indication information, and the indication information is used to indicate whether the first UE capability information indicates the incomplete capability of the UE; or the handover request carries first indication information, and the first indication information is used to indicate whether the first UE capability information indicates the incomplete capability of the UE.

According to the second possible implementation manner of the third aspect, in a fourth possible implementation manner, the handover request carries release information of the UE; and the base station further includes a processor, configured to determine, according to the release information, whether the first UE capability information indicates the incomplete capability of the UE.

According to the fourth possible implementation manner of the third aspect, in a fifth possible implementation manner, the processor is specifically configured to: if it is determined that the release information is later than or the same as a set release, determine that the first UE capability information indicates the incomplete capability of the UE; or if it is determined that the release information is earlier than a set release, determine that the first UE capability information indicates the complete capability of the UE.

According to the third aspect, in a sixth possible implementation manner, the receiver is further configured to receive second indication information that is sent by the UE and used to indicate whether the first UE capability information indicates the incomplete capability of the UE, and the second indication information is carried in a received handover complete message or a received random access request message sent by the UE.

According to a fourth aspect, an embodiment of the present invention provides user equipment UE, including a transmitter, configured to send first UE capability information to a core network device; and a receiver, configured to: if the first UE capability information indicates an incomplete capability of the UE, after the UE is handed over to a target base station, receive a capability enquiry request message sent by the target base station.

In a first possible implementation manner of the fourth aspect, the transmitter is further configured to send second UE capability information to the target base station, and the second UE capability information indicates a complete capability of the UE.

According to the fourth aspect or the first possible implementation manner of the fourth aspect, in a second possible implementation manner, the first UE capability information is carried in an Attach Request or a Routing Area Update Request sent by the UE to the core network device, or the first UE capability information is carried in Attach Complete or Routing Area Update Complete sent by the UE to the core network device.

According to the fourth aspect, any one of the first to the second possible implementation manner of the fourth aspect, in a third possible implementation manner, the first UE capability information includes indication information, and the indication information is used to indicate whether the first UE capability information indicates the incomplete capability of the UE; or the Attach Complete or the Routing Area Update Complete carries third indication information, and the third indication information is used to indicate whether the first UE capability information indicates the incomplete capability of the UE.

According to the fourth aspect, in a fourth possible implementation manner of the fourth aspect, including the transmitter is further configured to send, to the target base station, second indication information that is used to indicate whether the first UE capability information indicates the incomplete capability of the UE, and the second indication information is carried in a handover complete message or a random access request message that is sent by the UE and received by the target base station.

In the method for acquiring a UE capability, the terminal, and the base station according to the embodiments of the present invention, a target base station receives first UE capability information sent by a core network device or a source base station, and if the first UE capability information indicates an incomplete capability of a UE, after the UE is handed over to the target base station, the target base station determines, according to the first UE capability information, whether to acquire a complete capability of the UE. This method implements that in a handover process, the target base station may determine whether received UE capability information is complete, and determine, according to the first UE capability information, whether to acquire the complete capability of the UE.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

User equipment involved in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal (Mobile), a remote station, an access point, a remote terminal, an access terminal, a user terminal, a user agent, user device, or a user equipment.

The base station (for example, an access point) involved in this application may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS) or base station controller (BSC) in GSM or CDMA, or may be a base station (NodeB) or base station controller (RNC) in WCDMA, or may be an evolved NodeB (eNB or e-NodeB, evolved Node B) in LTE, which is not limited in the this application.

Figure 1:
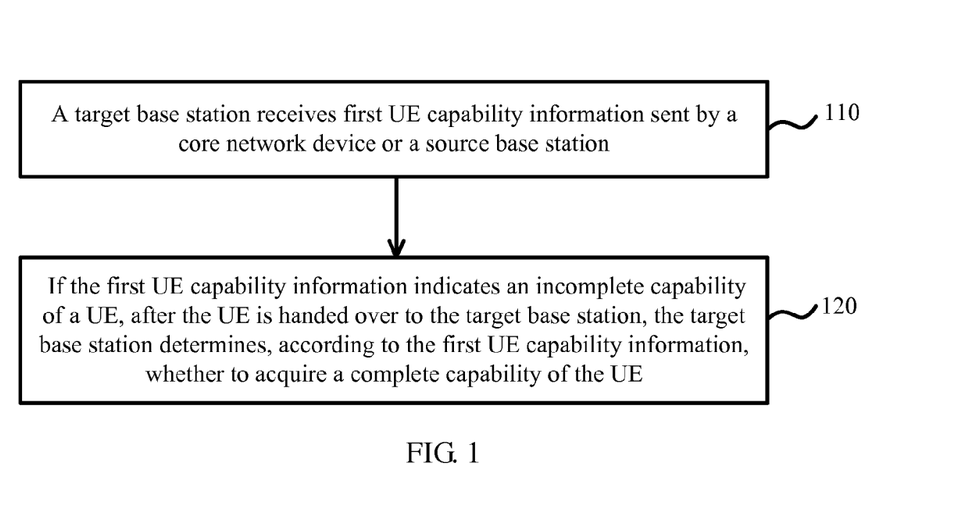
FIG. 1 is a flowchart of a method for acquiring a UE capability according to Embodiment 1 of the present invention.

FIG. 1 is a flowchart of a method for acquiring a UE capability according to Embodiment 1 of the present invention. The method is executed by a base station, and the base station is a target base station to which user equipment is handed over. The method in this embodiment includes the following steps:

S110. The target base station receives first UE capability information sent by a core network device or a source base station.

In a process in which the UE is handed over from the source base station to the target base station, the UE may send the first UE capability information to the core network device, and then the core network device adds the first UE capability information to a handover request and sends the handover request to the target base station; or before a process in which the UE is handed over from the source base station to the target base station, the UE sends the first UE capability information to the core network device, the core network device then sends the first UE capability information to the source base station, and the source base station adds the first UE capability information to a handover request in the handover process and sends the handover request to the target base station.

S120. If the first UE capability information indicates an incomplete capability of the UE, after the UE is handed over to the target base station, the target base station determines, according to the first UE capability information, whether to acquire a complete capability of the UE.

It should be noted that the first UE capability information may indicate the complete capability of the UE or may indicate the incomplete capability of the UE. This is because, for some communications systems, for example, a GERAN system, a maximum size of an information element that can be transmitted is 255 bytes, but capability information of some UEs may exceed 255 bytes. For example, in a case in which a UE whose capability is less than the 255 bytes, the UE transfers a complete capability in the GERAN system; in a case in which a UE whose capability is greater than the 255 bytes, the UE transfers an incomplete capability in the GERAN system. Therefore, the first UE capability information may indicate the incomplete capability of the UE. When the first UE capability information indicates the incomplete capability of the UE, the target base station can only perform configuration according to a minimum capability, and after a handover is completed, the target base station acquires the complete capability of the UE again. It should be noted that, although the first UE capability information indicates the incomplete capability of the UE, if capability information of the UE matches a release of the target base station, or the target base station may identify capability information of the UE, the target base station does not need to acquire the complete capability of the UE. For example, the capability information of the UE starts to be modified from a Release 10 (R10 for short) of 3GPP, that is, a base station of R10 may identify a capability of a UE of R10, but cannot identify a capability of a UE of R12. When the UE of R12 reports an incomplete capability of the UE to the base station of R10, but actually this part of UE capability is complete for R10, so that after a handover is completed, the base station of R10 does not need to request the UE of R12 to send a complete capability of the UE. For another example, the capability information of the UE starts to be modified from the Release 10 (R10 for short) of 3GPP. When the UE of R12 reports the incomplete capability of the UE to a base station of R12, after the handover is completed, the base station of R12 needs to request the UE of R12 to send the complete capability of the UE. Specifically, when the target base station needs to acquire the complete capability of the UE, after the UE is handed over to the target base station, the target base station may send a capability enquiry request message to the UE, so as to acquire the complete capability of the UE. It may be understood that, if the first UE capability information indicates the complete capability of the UE, the target base station does not need to further send the capability enquiry request message to the UE, thereby reducing signaling overheads.

In a feasible implementation manner, when sending the first UE capability information to the core network device, the UE may notify the core network device that the first UE capability information indicates the complete capability of the UE or indicates the incomplete capability of the UE. In this way, the core network device may further notify the target base station or the source base station that the first UE capability information indicates the complete capability of the UE or indicates the incomplete capability of the UE.

In another feasible implementation manner, when sending the first UE capability information to the core network device, the UE may notify the core network device of release information of the UE, for example, a release number of the UE. In this way, the core network device may further notify the target base station of the release information of the UE, and the core network device may further determine, according to the release information of the UE, whether the first UE capability information indicates the complete capability of the UE or indicates the incomplete capability of the UE. In this way, the core network device may further notify the target base station or the source base station that the first UE capability information indicates the complete capability of the UE or indicates the incomplete capability of the UE.

In the method for acquiring a UE capability according to this embodiment, a target base station determines whether a UE capability indicated by first UE capability information is complete, and when the UE capability indicated by the first UE capability information is incomplete, after a UE is handed over to the target base station, the target base station determines, according to the first UE capability information, whether to acquire a complete capability of the UE, which implements that in a handover process, the target base station may determine whether the received first UE capability information is complete, and determine, according to the first UE capability information, whether to acquire the complete capability of the UE.

Further, on a basis of the foregoing embodiment, if the first UE capability information indicates the incomplete capability of the UE, after the UE is handed over to the target base station, the target base station may receive second UE capability information sent by the UE, where the second UE capability information indicates the complete capability of the UE. The first UE capability information may be carried in the handover request that is sent by the core network device or the source base station and received by the target base station. In this scenario, the target base station that acquires the incomplete capability of the UE may acquire the complete capability of the UE again, which ensures that the UE that is handed over to the target base station can work normally.

Figure 2:
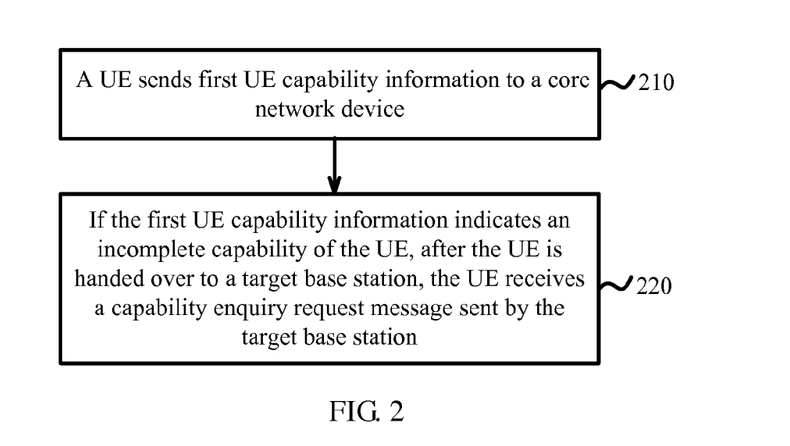
FIG. 2 is a flowchart of a method for acquiring a UE capability according to Embodiment 2 of the present invention.

FIG. 2 is a flowchart of a method for acquiring a UE capability according to Embodiment 2 of the present invention. The method is executed by a UE, and the method in this embodiment includes the following steps:

S210. The UE sends first UE capability information to a core network device.

S220. If the first UE capability information indicates an incomplete capability of the UE, after the UE is handed over to a target base station, the UE receives a capability enquiry request message sent by the target base station.

Specifically, if the first UE capability information sent by the UE to the core network device indicates the incomplete capability of the UE, after the UE is handed over to the target base station, if receiving the capability enquiry request message sent by the target base station, the UE sends second UE capability information that indicates a complete capability of the UE to the target base station.

In the method for acquiring a UE capability according to this embodiment, after a UE is handed over to a target base station, if receiving a capability enquiry request message sent by the target base station, the UE sends second UE capability information that indicates a complete capability of the UE to the target base station. Therefore, this method implements that after a handover is completed, a target base station that has acquired the complete capability of the UE does not need to acquire the capability of the UE again, so that signaling overheads are reduced and a system burden is relieved. The target base station that acquires the incomplete capability of the UE acquires the complete capability of the UE again, which ensures that the UE that is handed over to the target base station can work normally.

The following embodiments use a process in which the UE is handed over from a GERAN system to an LTE system as an example for description, that is, a source base station involved in the following is a base station controller of the GERAN system, and a target base station is a base station of the LTE system.

Figure 3:
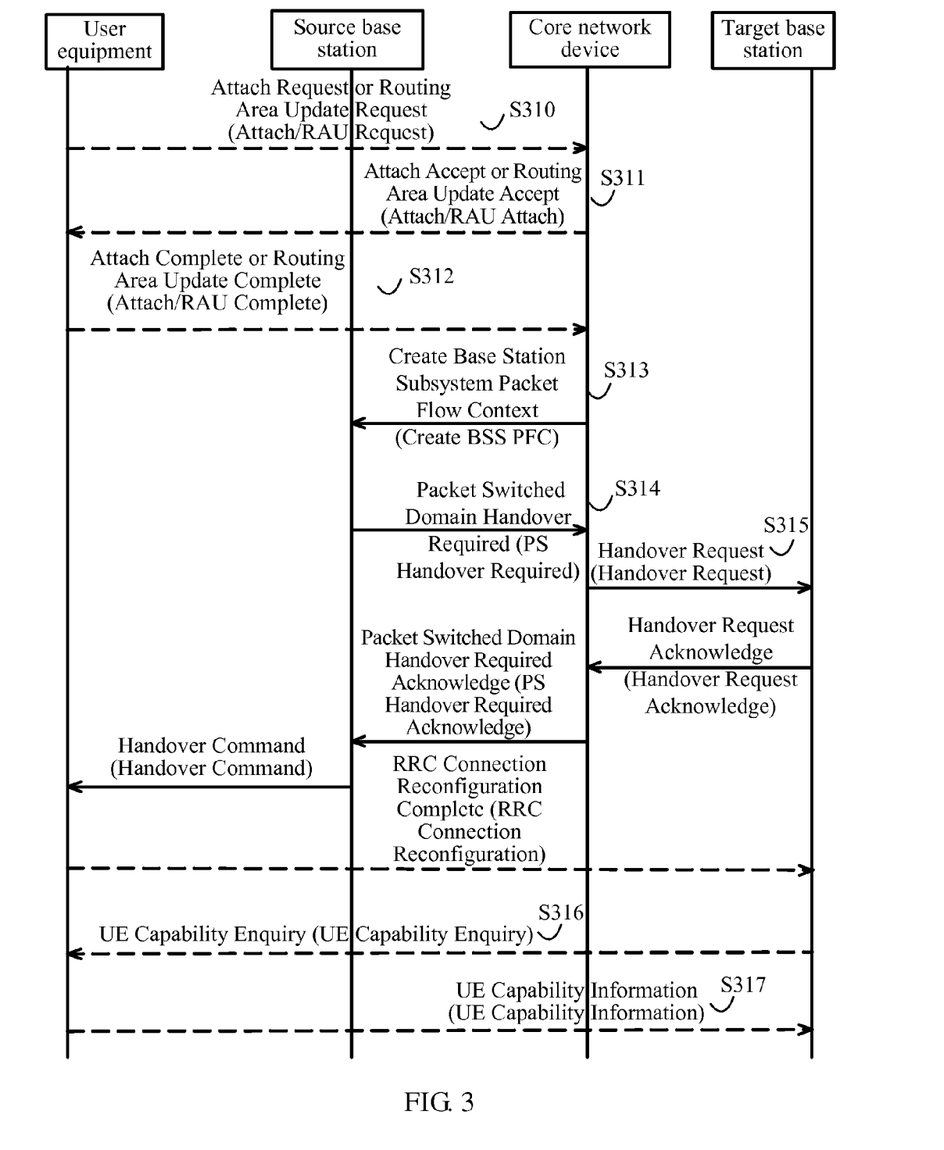
FIG. 3 is a signaling diagram of a method for acquiring a UE capability according to Embodiment 3 of the present invention.

FIG. 3 is a signaling diagram of a method for acquiring a UE capability according to Embodiment 3 of the present invention. An implementation scenario provided in this embodiment is as follows: First UE capability information that is sent by a UE to a core network device includes indication information, and the first UE capability information that is sent by the core network device to a target base station includes the indication information. The method includes the following steps:

S310. The UE sends an Attach Request or a Routing Area Update Request to the core network device.

The Attach Request or the Routing Area Update Request (Attach/RAU Request) carries the first UE capability information.

S311. The core network device sends Attach Accept or Routing Area Update Accept (Attach/RAU Accept) to the UE.

S312. The UE sends Attach Complete or Routing Area Update Complete (Attach/RAU Complete) to the core network device.

It should be noted that the UE may add the first UE capability information to the Attach Request in S310, or add the first UE capability information to the Attach Complete or the Routing Area Update Complete in S312.

Optionally, the first UE capability information includes the indication information, and the indication information is used to indicate whether the first UE capability information indicates an incomplete capability of the UE.

S313. The core network device sends a Create Base Station Subsystem Packet Flow Context (Create BSS PFC) to a source base station.

S314. The source base station sends Packet Switched Domain Handover Required (PS Handover Required) to the core network device.

S315. The target base station receives a handover request sent by the core network device, where the handover request carries the first UE capability information.

A handover request message is Handover Request. Optionally, the first UE capability information includes the indication information, and the indication information is used to indicate whether the first UE capability information indicates the incomplete capability of the UE.

Specifically, the indication information included in the first UE capability information may be implemented by using a method for adding one bit to the first UE capability information, where the indication information may be indicated as a Boolean type or may be indicated as an enumeration type. Herein, an example in which the indication information is the enumeration type is used for description. For example, one indication bit is added to "UE-EUTRA-Capability": UE-EUTRA-Capability-vxxx-IEs::=SEQUENCE {incompleteCapability ENUMERATED {true} OPTIONAL}. Alternatively, the indication information included in the first UE capability information may be implemented by using a method for reusing an idle bit in a feature group indication (FGI) that is introduced in Release 8 of the 3rd Generation Partnership Project (3GPP) LTE protocol. For example, when an idle bit 31 or an idle bit 32 is set to 1, it indicates the incomplete capability of the UE; when the idle bit 31 or the idle bit 32 is set to 0, it indicates the complete capability of the UE; or any bit of bits 117-132 in the FGI that is introduced in Release 10 of the 3GPP LTE protocol indicates whether the capability of the UE is complete.

S316. If the first UE capability information indicates an incomplete capability of the UE, after the UE is handed over to the target base station, the target base station sends a capability enquiry request message to the UE.

In this embodiment, because the first UE capability information in S315 includes the indication information, the target base station may directly determine, according to the indication information, whether the first UE capability information indicates the incomplete capability of the UE or the complete capability of the UE. If the first UE capability information indicates the incomplete capability of the UE, S317 is performed; otherwise, the procedure ends.

S317. The target base station receives second UE capability information sent by the UE, where the second UE capability information indicates a complete capability of the UE.

In the method for acquiring a UE capability according to this embodiment, a target base station determines, by determining a bit that is included in first UE capability information and indicates whether the first UE capability information is an incomplete capability of a UE, whether a received capability of the UE is complete; and when the received capability of the UE is incomplete, sends a capability enquiry request message to the UE, so as to acquire a complete capability of the UE. Therefore, the method implements that after a handover is completed, a target base station that has acquired the complete capability of the UE does not need to acquire the capability of the UE again, so that signaling overheads are reduced and a system burden is relieved; and a target base station that acquires the incomplete capability of the UE acquires the complete capability of the UE again, which ensures that the UE that is handed over to the target base station can work normally.

Figure 4:
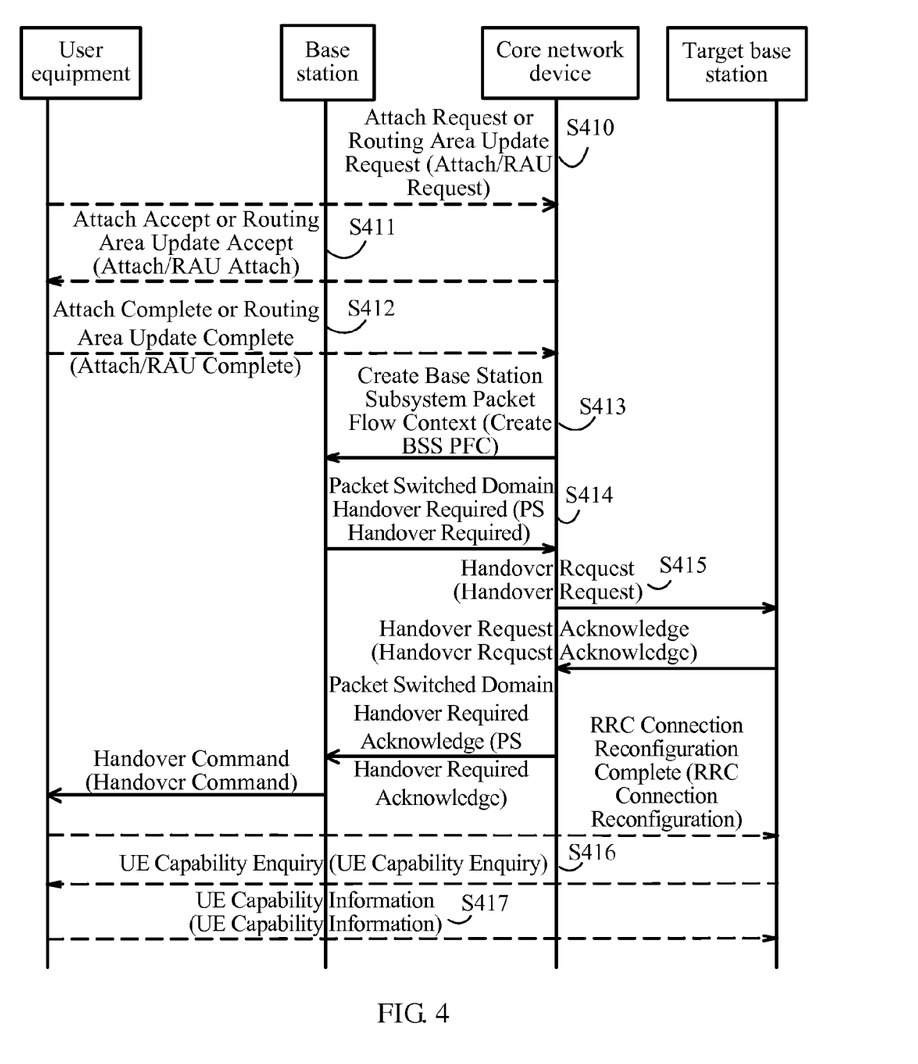
FIG. 4 is a signaling diagram of a method for acquiring a UE capability according to Embodiment 4 of the present invention.

FIG. 4 is a signaling diagram of a method for acquiring a UE capability according to Embodiment 4 of the present invention. An implementation scenario provided in this embodiment is as follows: Attach Complete or Routing Area Update Complete sent by a UE to a core network device carries third indication information that is used to indicate whether first UE capability information indicates an incomplete capability of the UE. If release information of the UE is used as the third indication information, the release information of the UE may be carried in the first UE capability information, or an information element may be directly added to the Attach Complete or the Routing Area Update Complete to indicate the release information of the UE. A handover request sent by the core network device or a source base station to a target base station carries the release information of the UE. Referring to FIG. 4, the method in this embodiment includes the following steps:

S410. The UE sends "Attach/RAU Request" to the core network device.

S411. The core network device sends "Attach/RAU Accept" to the UE.

S412. The UE sends "Attach/RAU Complete" to the core network device.

It should be noted that the UE may add the first UE capability information to the Attach Complete or the Routing Area Update Complete in S412, where the Attach Complete or the Routing Area Update Complete may carry the third indication information, and the third indication information is used to indicate whether the first UE capability information indicates the incomplete capability of the UE. In this embodiment, the third indication information may be the release information of the UE, and the release information may be carried in the first UE capability information, or an information element may be directly added to the Attach Complete or the Routing Area Update Complete to indicate the release information of the UE. For example, it may be specified in a protocol that the Attach Complete or the Routing Area Update Complete carries the third indication information, for example, carries the release information of the UE, and the release information of the UE, for example, a release number of the UE, transfers only incomplete information of the UE starting from a UE of a fixed release or a sub-release. The target base station may determine, by checking a release or a sub-release of the UE, whether the capability of the UE needs to be acquired again after a handover succeeds. For example, one manner is as follows: It may be specified in a protocol that the handover request carries the incomplete capability of the UE starting from Release 10, and for a UE that is earlier than Release 10, the handover request carries the complete capability of the UE. The foregoing protocol specifies that starting from the UE of the fixed release or the sub-release, only the incomplete capability of the UE is transferred. It should be noted that another manner is as follows: It may also be specified in a protocol that a specific release indicates that the incomplete capability of the UE is transferred, for example, Release 9 indicates that the incomplete capability is carried, and all other releases indicate that the complete capability is carried. In conclusion, the protocol specifies that a manner that is adopted is optional, and any implementation manner based on this idea shall fall within the protection scope of the present invention.

S413. The core network device sends "Create BSS PFC" to the source base station.

S414. The source base station sends "PS Handover Required" to the core network device.

S415. The target base station receives the handover request sent by the core network device, where the handover request carries the first UE capability information.

A handover request message is Handover Request. Optionally, the handover request carries first indication information, where the first indication information is used to indicate whether the first UE capability information indicates the incomplete capability of the UE, and the first indication information determines, according to the carried release information of the UE in S412-S414, whether to indicate the incomplete capability of the UE in the handover request. If the release information of the UE in S412 is carried in the first UE capability information and indicates the incomplete capability of the UE, the core network device cannot parse the release information of the UE in the first UE capability information, that is, the release information of the UE in the first UE capability information is transparently transmitted by the core network device to the target base station, the handover request sent by the core network device to the target base station does not carry the first indication information, and the target base station parses the handover request message to acquire the release information of the UE. If the release information of the UE is indicated by directly adding an information element to the Attach Complete or the Routing Area Updating Complete in S412, the core network device may acquire the release information of the UE, and add the first indication information to the handover request to notify the target base station of whether the first UE capability information indicates the incomplete capability of the UE.

Specifically, the first indication information may be indicated as a Boolean type or may be an enumeration type. For example, the first indication information added to the handover request is an information element "Incomplete E-UTRAN information", and a type of the information element is a Boolean type or an enumeration type. If the information element is the enumeration type, when the information element is "Incomplete", it indicates that a sent UE capability is incomplete, and when the information element is "Complete", it indicates that the sent UE capability is complete.

S416. If the first UE capability information indicates the incomplete capability of the UE, after the UE is handed over to the target base station, the target base station sends a capability enquiry request message to the UE.

In this embodiment, the release information of the UE in S412 is carried in the first UE capability information, and the target base station pares the handover request message to acquire the release information of the UE, and determines, according to the release information of the UE, whether the first UE capability information indicates the incomplete capability of the UE. If the release information of the UE indicates the incomplete capability of the UE, S417 is performed; otherwise, the procedure ends. If the release information of the UE is indicated by directly adding an information element to the Attach Complete or the Routing Area Update Complete in S412, the target base station determines, according to the first indication information in the handover request, whether the first UE capability information indicates the incomplete capability of the UE. If the first indication information indicates the incomplete capability of the UE, S417 is performed; otherwise, the procedure ends.

S417. The target base station receives second UE capability information sent by the UE, where the second UE capability information indicates a complete capability of the UE.

In the method for acquiring a UE capability according to this embodiment, a target base station determines, by determining release information or first indication information carried in a handover request, whether first UE capability information indicates an incomplete capability of a UE; and when determining, by using the release information or the first indication information, a received UE capability is incomplete, sends a capability enquiry request message to the UE, so as to acquire a complete capability of the UE. Therefore, the method implements that after a handover is completed, a target base station that has acquired the complete capability of the UE does not need to acquire the capability of the UE again, so that signaling overheads are reduced, and a system burden is relieved; and a target base station that acquires the incomplete capability of the UE acquires the complete capability of the UE again, which ensures that the UE that is handed over to the target base station can work normally.

Figure 5:
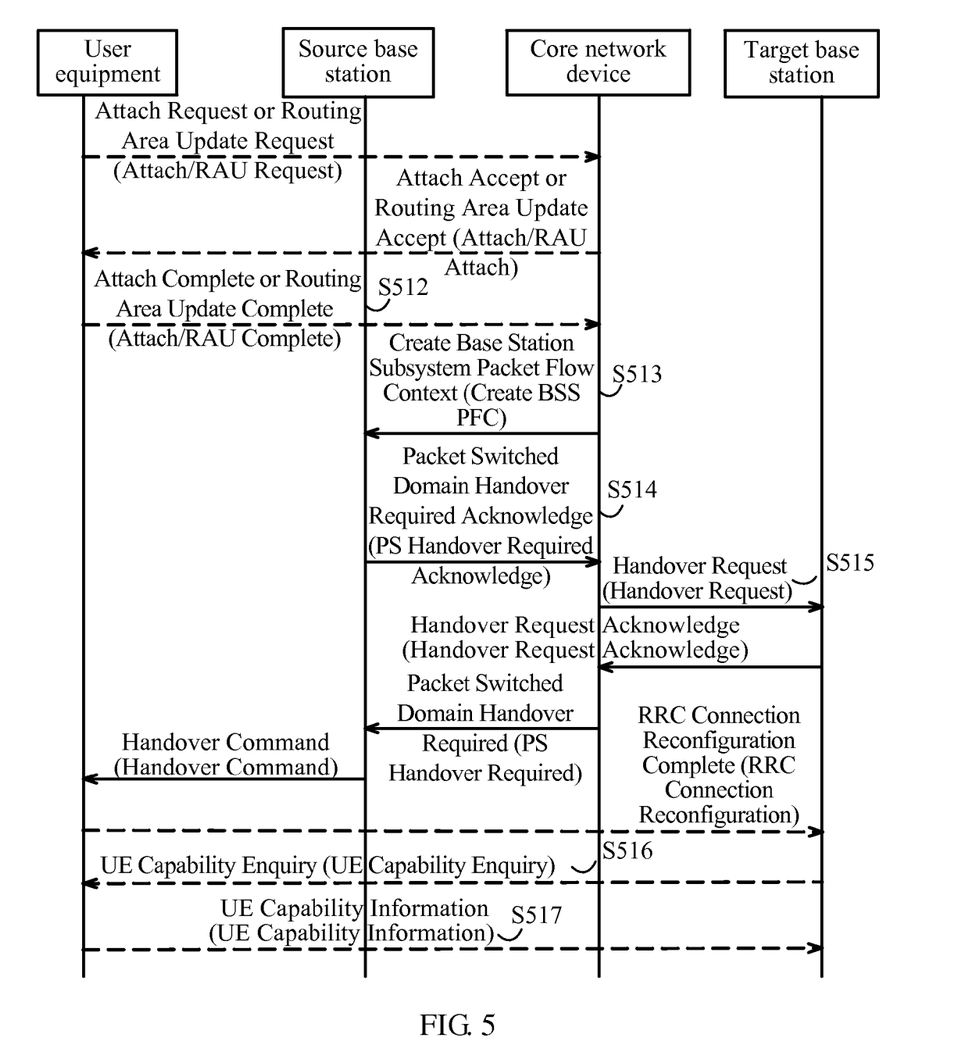
FIG. 5 is a signaling diagram of a method for acquiring a UE capability according to Embodiment 5 of the present invention.

FIG. 5 is a signaling diagram of a method for acquiring a UE capability according to Embodiment 5 of the present invention. An implementation scenario provided in this embodiment is as follows: Attach Complete or Routing Area Update Complete sent by a UE to a core network device carries an information element "Incomplete E-UTRAN information" that is used to indicate whether first UE capability information indicates an incomplete capability of the UE, and the information element "Incomplete E-UTRAN information" is added to the first UE capability information sent by the core network device to a target base station. Referring to FIG. 5, the method in this embodiment includes the following steps:

S510. The UE sends "Attach/RAU Request" to the core network device.

S511. The core network device sends "Attach/RAU Accept" to the UE.

S512. The UE sends "Attach/RAU Complete" to the core network device.

It should be noted that the UE may add the first UE capability information to the Attach Complete or the Routing Area Update Complete in S512, and the Attach Complete or the Routing Area Update Complete carries third indication information, where the third indication information is used to indicate whether the first UE capability information indicates the incomplete capability of the UE. As described in the foregoing Embodiment 4, the third indication information may be carried in the first UE capability information, or an information element may be directly added to the Attach Complete or the Routing Area Update Complete to indicate the third indication information. Herein, an example in which an information element is directly added to the Attach Complete or the Routing Area Update Complete to indicate the third indication information is used for description. For example, the information element "Incomplete E-UTRAN information" may be added to the Attach Complete, and information carried in the information element is used to indicate whether the first UE capability information indicates the incomplete capability of the UE.

S513. The core network device sends "Create BSS PFC" to a source base station.

After receiving the Attach Complete or the Route Area Update Complete "Attach/Route Area Update Complete", the core network device informs, by adding an indication to a "CREATE-BSS-PFC" message that is sent to the source base station, the source base station of whether the first UE capability information indicates the incomplete capability of the UE, where a method for adding the indication is the same as a method described in S512, which is not described herein again.

S514. The source base station sends "PS Handover Required" to the core network device.

The source base station adds an indication to a "PS Handover Required" message to notify the core network device of whether the capability of the UE is complete, where a method for adding the indication is the same as a method described in S512, which is not described herein again.

S515. The target base station receives a handover request sent by the core network device, where the handover request carries the first UE capability information.

A handover request message is "Handover Request". Optionally, the handover request carries first indication information, where the first indication information is used to indicate whether the first UE capability information indicates the incomplete capability of the UE. A method for adding the first indication information to the handover request is the same as a method in S512 for directly adding an information element to indicate the first indication information, which is not described herein again.

S516. If the first UE capability information indicates the incomplete capability of the UE, after the UE is handed over to the target base station, the target base station sends a capability enquiry request message to the UE.

In this embodiment, it may be determined, according to the first indication information, whether the first UE capability information indicates the incomplete capability of the UE. If the first indication information indicates the incomplete capability of the UE, S517 is performed; otherwise, the procedure ends.

S517. The target base station receives second UE capability information sent by the UE, where the second UE capability information indicates a complete capability of the UE.

In the method for acquiring a UE capability according to this embodiment, a target base station determines, by determining first indication information carried in a handover request, whether first UE capability information indicates an incomplete capability of a UE; and when determining that a received UE capability is incomplete by using the first indication information, sends a capability enquiry request message to the UE, so as to acquire a complete capability of the UE. Therefore, the method implements that after a handover is completed, a target base station that has acquired the complete capability of the UE does not need to acquire the capability of the UE again, so that signaling overheads are reduced, and a system burden is relieved; and a target base station that acquires the incomplete capability of the UE acquires the complete capability of the UE again, which ensures that the UE that is handed over to the target base station can work normally.

Further, it should be noted that in the foregoing Embodiment 5, the UE sends the "Attach/Route Area Update Complete" to the core network device, and after receiving an "Attach/Route Area Update Complete" message, the core network device learns that the UE capability is incomplete. When the source base station sends a "PS-HANDOVER-REQUIRED" message to the core network device, the core network device adds the first indication information to a "Handover Request" message to notify the target base station that the UE capability is incomplete, so that the target base station may learn whether the UE capability needs to be acquired again without checking the UE capability. That is, after receiving the "Attach/Route Area Update Complete" message and learning that the UE capability is incomplete, the core network device may not need to inform the source base station of whether the first UE capability information indicates the incomplete capability of the UE, and when the source base station sends the "PS-HANDOVER-REQUIRED" message to the core network device, the core network device adds the first indication information to the "Handover Request" message.

Figure 6:
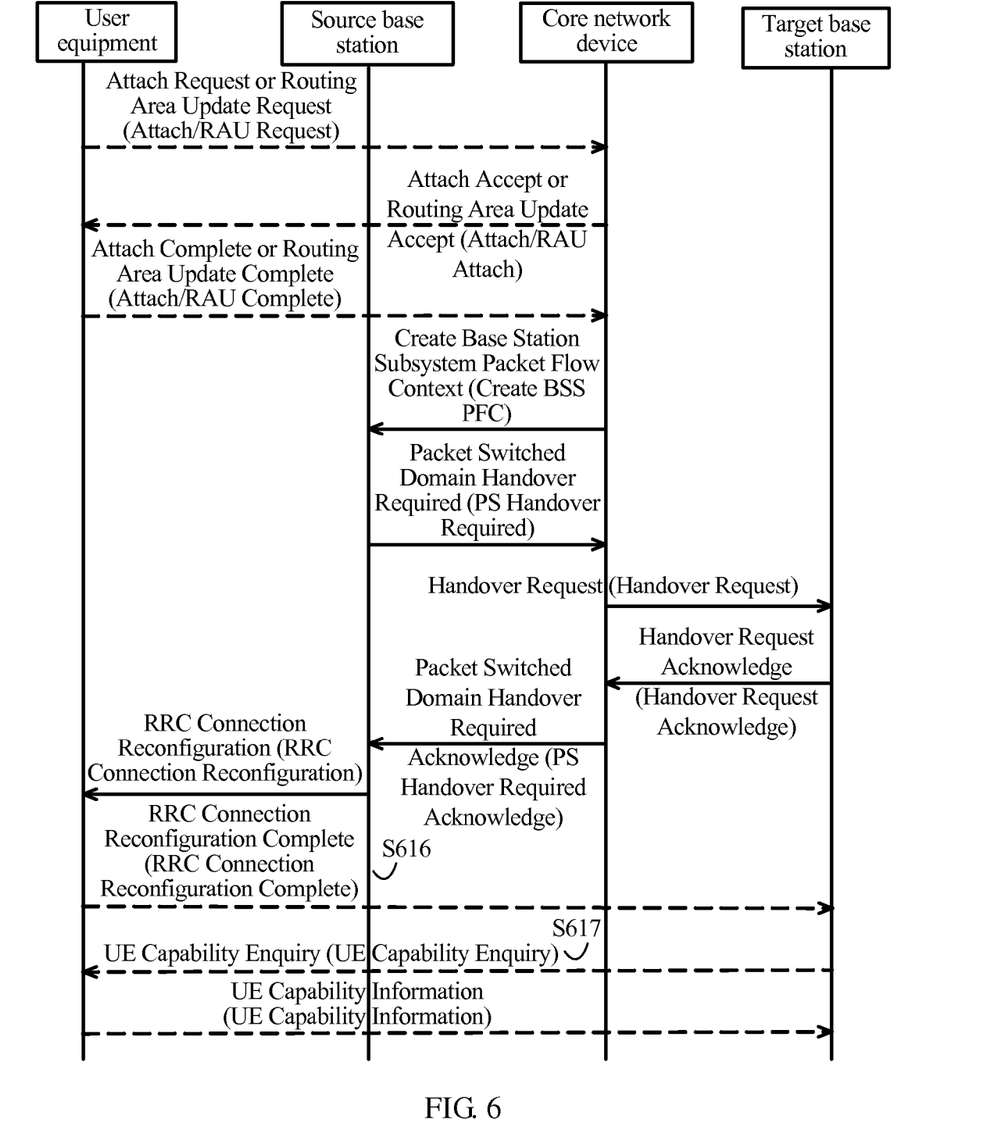
FIG. 6 is a signaling diagram of a method for acquiring a UE capability according to Embodiment 6 of the present invention.

FIG. 6 is a signaling diagram of a method for acquiring a UE capability according to Embodiment 6 of the present invention. An implementation scenario provided in this embodiment is as follows: RRC Connection Reconfiguration Complete or a random access request sent by a UE to a target base station carries second indication information that is used to indicate whether first UE capability information indicates an incomplete capability of a UE; after receiving the RRC Connection Reconfiguration Complete or the random access request, the target base station determines, according to the second indication information, whether a received UE capability is complete. Referring to FIG. 6, the method in this embodiment includes the following steps:

S616. The UE sends, to the target base station, the second indication information that is used to indicate whether the first UE capability information indicates the incomplete capability of the UE.

The second indication information may be carried in a handover complete message or a random access request message that is sent by the UE and received by the target base station.

In S616, the second indication information may be added to the handover complete message sent by the UE. For a target base station of an LTE system, the handover complete message sent by the UE to the target base station may be indicated by using an RRC Connection Reconfiguration Complete message, and the second indication information is added to the RRC Connection Reconfiguration Complete. It should be noted herein that a type of the added second indication information that indicates whether the first UE capability information indicates the incomplete capability of the UE is not limited, and the type of the second indication information may be a Boolean type or may be an enumeration type. Herein, an example in which the second indication information is the enumeration type is used for description. A location of the second indication information "incompleteCapability" in the RRC Connection Reconfiguration Complete may be as follows: RRCConnectionReconfigurationComplete-vxxx-IEs::=SEQUENCE {incompleteCapability ENUMERATED {true} OPTIONAL}.

S617. If the first UE capability information indicates the incomplete capability of the UE, after the UE is handed over to the target base station, the target base station determines whether to acquire a complete capability of the UE.

Specifically, S617 may include sending, by the target base station, a capability enquiry request message to the UE; and receiving, by the target base station, second UE capability information sent by the UE, where the second UE capability information indicates the complete capability of the UE.

In the method for acquiring a UE capability according to this embodiment, a target base station determines, by determining second indication information in a received handover complete message or a received random access request message sent by a UE, whether first UE capability information indicates an incomplete capability of the UE; and when determining that the first UE capability information indicates the incomplete capability of the UE, sends a capability enquiry request message to the UE, so as to acquire a complete capability of the UE. Therefore, the method implements that after a handover is completed, a target base station that has acquired the complete capability of the UE does not need to acquire the capability of the UE again, so that signaling overheads are reduced, and a system burden is relieved; and a target base station that acquires the incomplete capability of the UE acquires the complete capability of the UE again, which ensures that the UE that is handed over to the target base station can work normally.

Figure 7:
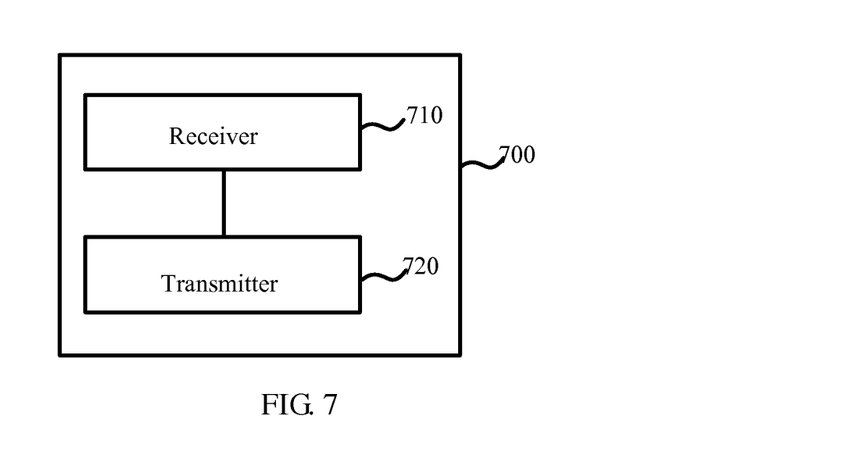
FIG. 7 is a schematic structural diagram of a base station 700 according to Embodiment 7 of the present invention.

FIG. 7 is a schematic structural diagram of a base station 700 according to Embodiment 7 of the present invention. The base station in this embodiment is applicable to a case in which, in a process of handing over a UE from a GERAN system to an LTE system, only a target base station that acquires an incomplete capability of the UE sends capability enquiry request information to the UE. The base station is generally implemented by using hardware and/or software. The base station includes a receiver 710 and a transmitter 720.

The receiver 710 is configured to receive first UE capability information sent by a core network device or a source base station, and the transmitter 720 is configured to: if the first UE capability information indicates the incomplete capability of the UE, after the UE is handed over to the target base station, determine, according to the first UE capability information, whether to acquire a complete capability of the UE.

The base station provided in this embodiment determines whether a UE capability indicated by first UE capability information is complete; and when the UE capability indicated by the first UE capability information is incomplete, determines, according to the first UE capability information, whether to send a capability enquiry request message to a UE, so as to acquire a complete capability of the UE, which implements that in a handover process, a target base station may determine whether received UE capability information is complete, and determine, according to the first UE capability information, whether to acquire the complete capability of the UE.

On a basis of the foregoing Embodiment 7, further, the receiver 710 is further configured to: if the first UE capability information indicates the incomplete capability of the UE, after the UE is handed over to the target base station, receive second UE capability information sent by the UE, where the second UE capability information indicates the complete capability of the UE. The first UE capability information is carried in a handover request that is sent by the core network device or the source base station and received by the target base station. The first UE capability information may include indication information, and the indication information is used to indicate whether the first UE capability information indicates the incomplete capability of the UE; or the first UE capability information carries first indication information, and the first indication information is used to indicate whether the first UE capability information indicates the incomplete capability of the UE. The receiver 710 is further configured to receive second indication information that is sent by the UE and used to indicate whether the first UE capability information indicates the incomplete capability of the UE, and the second indication information is carried in a received handover complete message or a received random access request message sent by the UE.

Figure 8:
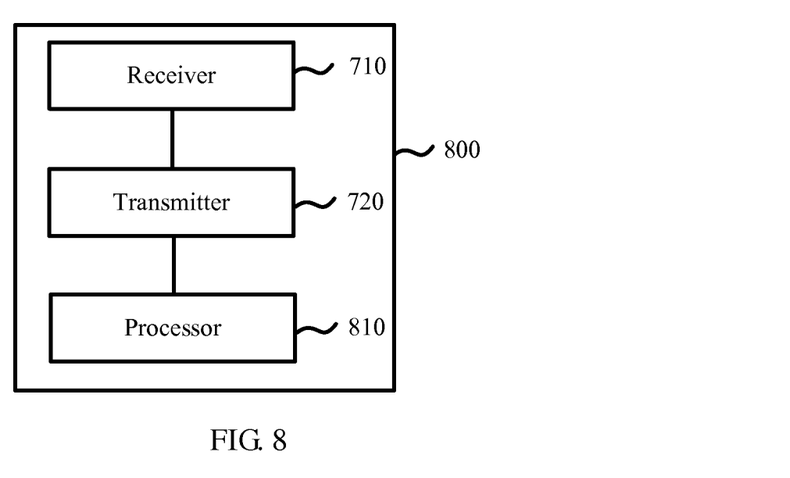
FIG. 8 is a schematic structural diagram of a base station 800 according to Embodiment 8 of the present invention.

FIG. 8 is a schematic structural diagram of a base station 800 according to Embodiment 8 of the present invention. Referring to FIG. 8, on a basis of the foregoing Embodiment 7, the base station receives release information that is of a UE and carried in a handover request sent by a core network device or a source base station; or the base station receives release information that is of a UE and included in first UE capability information carried in a handover request that is sent by a core network device or a source base station. The base station further includes a processor 810.

The processor 810 is configured to determine, according to the release information, whether the first UE capability information indicates an incomplete capability of the UE.

The processor 810 is specifically configured to: if it is determined that release information is not earlier than a set release or is the same as a set release, determine that the first UE capability information indicates the incomplete capability of the UE; or if it is determined that release information is earlier than a set release, determine that the first UE capability information indicates a complete capability of the UE.

The base station provided in this embodiment determines, by determining release information carried in a handover request, whether first UE capability information indicates an incomplete capability of a UE; and when determining that a received UE capability is incomplete by using the release information, sends a capability enquiry request message to the UE, so as to acquire a complete capability of the UE, thereby implementing that after a handover is completed, a target base station that has acquired the complete capability of the UE does not need to acquire the capability of the UE again, so that signaling overheads are reduced and a system burden is relieved; and a target base station that acquires the incomplete capability of the UE acquires the complete capability of the UE again, which ensures that the UE that is handed over to the target base station can work normally.

Figure 9:
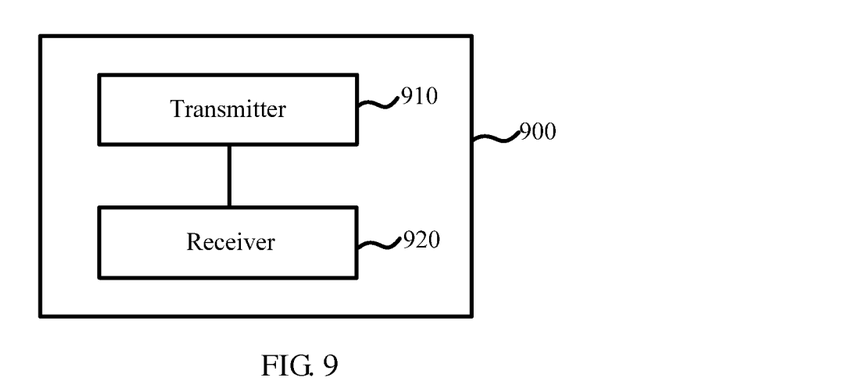
FIG. 9 is a schematic structural diagram of a UE 900 according to Embodiment 9 of the present invention.

FIG. 9 is a schematic structural diagram of a UE 900 according to Embodiment 9 of the present invention. The UE in this embodiment is applicable to a case in which, in a process of handing over the UE from a GERAN system to an LTE system, if the UE previously sends an incomplete capability of the UE to a core network device, after the UE is handed over to a target base station, the UE sends a complete capability of the UE to the target base station after receiving a capability enquiry request message sent by the target base station. The UE is generally implemented by using hardware and/or software. The UE in this embodiment includes a transmitter 910 and a receiver 920.

The transmitter 910 is configured to send first UE capability information to the core network device, and the receiver 920 is configured to: if the first UE capability information indicates the incomplete capability of the UE, after the UE is handed over to the target base station, receive the capability enquiry request message sent by the target base station. The transmitter 910 is further configured to: if the first UE capability information indicates the incomplete capability of the UE, after the UE is handed over to the target base station, the UE sends second UE capability information to the target base station, where the second UE capability information indicates the complete capability of the UE. The first UE capability information is carried in an Attach Request or a Routing Area Update Request sent by the UE to the core network device, or the first UE capability information is carried in Attach Complete or Routing Area Update Complete sent by the UE to the core network device. The transmitter 910 is further configured to: if the first UE capability information indicates the incomplete capability of the UE, after the UE is handed over to the target base station, send the second UE capability information to the target base station, where the second UE capability information indicates the complete capability of the UE.

After being handed over to a target base station, if the UE provided in this embodiment receives a capability enquiry request message sent by the target base station, the UE sends second UE capability information that indicates a complete capability of the UE to the target base station, thereby implementing that after a handover is completed, a UE that has sent a complete capability of the UE does not need to send the capability of the UE to the target base station again, so that signaling overheads are reduced and a system burden is relieved; and a UE that has sent an incomplete capability of the UE sends a complete capability of the UE to the target base station again, which ensures that the UE that is handed over to the target base station can work normally.

On a basis of the foregoing Embodiment 9, further, the first UE capability information is carried in the Attach Request or the Routing Area Update Request sent by the UE to the core network device, or the first UE capability information is carried in the Attach Complete or the Routing Area Update Complete sent by the UE to the core network device. The first UE capability information may include indication information, and the indication information is used to indicate whether the first UE capability information indicates the incomplete capability of the UE; or the first UE capability information may carry third indication information, and the third indication information is used to indicate whether the first UE capability information indicates the incomplete capability of the UE. The transmitter 910 is further configured to send, to the target base station, second indication information that is used to indicate whether the first UE capability information indicates the incomplete capability of the UE, and the second indication information is carried in a handover complete message or a random access request message that is sent by the UE and received by the target base station.

Figure 10:
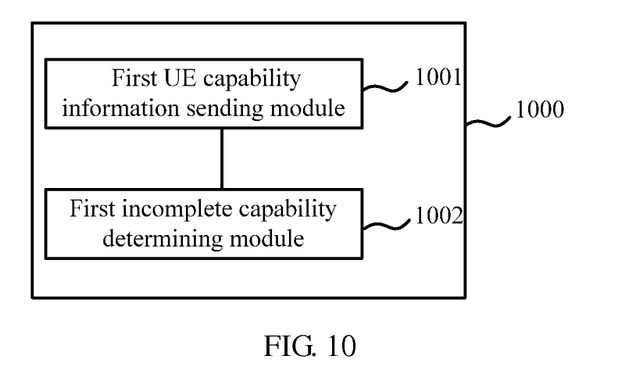
FIG. 10 is a schematic structural diagram of an apparatus 1000 for acquiring a UE capability according to Embodiment 10 of the present invention.

FIG. 10 is a schematic structural diagram of an apparatus 1000 for acquiring a UE capability according to Embodiment 10 of the present invention. The apparatus in this embodiment is applicable to a case in which, in a process of handing over a UE from a GERAN system to an LTE system, only a target base station that acquires an incomplete capability of a UE sends capability enquiry request information to the UE. The apparatus is generally implemented by using hardware and/or software. The apparatus includes the following modules: a first UE capability information sending module 1001 and a first incomplete capability determining module 1002.

The first UE capability information sending module 1001 is configured to receive the first UE capability information sent by a core network device or a source base station, and the first incomplete capability determining module 1002 is configured to: if the first UE capability information indicates an incomplete capability of the UE, determine, according to the first UE capability information, whether to acquire a complete capability of the UE.

The apparatus provided in this embodiment determines whether a UE capability indicated by first UE capability information is complete; and when the UE capability indicated by the first UE capability information is incomplete, determines, according to the first UE capability information, whether to send a capability enquiry request message to the UE, so as to acquire a complete capability of the UE, which implements that in a handover process, a target base station may determine whether received UE capability information is complete, and determine, according to the first UE capability information, whether to acquire the complete capability of the UE. The apparatus in this embodiment may be a base station.

On a basis of the foregoing Embodiment 7, further, the first UE capability information sending module 1001 is further configured to: if the first UE capability information indicates the incomplete capability of the UE, after the UE is handed over to the target base station, receive second UE capability information sent by the UE, where the second UE capability information indicates the complete capability of the UE. The first UE capability information is carried in a handover request that is sent by the core network device or the source base station and received by the target base station. The first UE capability information may include indication information, and the indication information is used to indicate whether the first UE capability information indicates the incomplete capability of the UE; or the first UE capability information carries first indication information, and the first indication information is used to indicate whether the first UE capability information indicates the incomplete capability of the UE. The first UE capability information sending module 1001 is further configured to receive second indication information that is sent by the UE and used to indicate whether the first UE capability information indicates the incomplete capability of the UE, and the second indication information is carried in a received handover complete message or a received random access request message sent by the UE.

Figure 11:
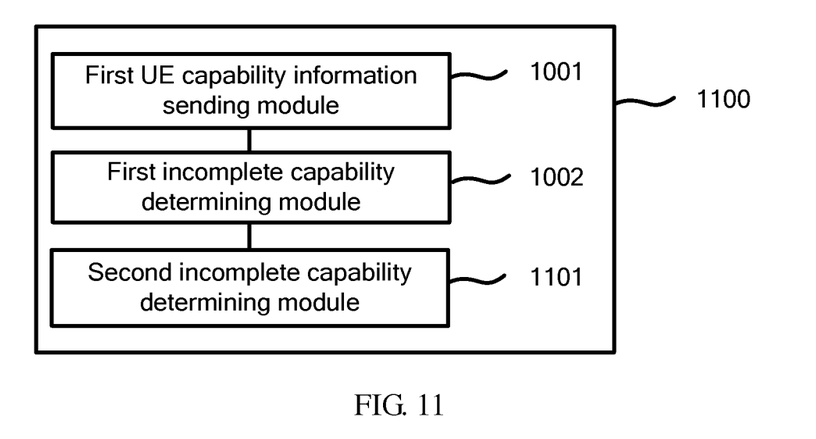
FIG. 11 is a schematic structural diagram of an apparatus 1100 for acquiring a UE capability according to Embodiment 11 of the present invention.

FIG. 11 is a schematic structural diagram of an apparatus 1100 for acquiring a UE capability according to Embodiment 11 of the present invention. Referring to FIG. 11, on a basis of the foregoing Embodiment 10, the apparatus receives release information that is of a UE and carried in a handover request sent by a core network device or a source base station, or the apparatus receives release information that is of a UE and included in first UE capability information carried in a handover request that is sent by a core network device or a source base station. The apparatus further includes a second incomplete capability determining module 1101.

The second incomplete capability determining module 1101 is configured to determine, according to the release information, whether the first UE capability information indicates an incomplete capability of the UE.

The second incomplete capability determining module 1101 is specifically configured to: if it is determined that the release information is not earlier than a set release or is the same as a set release, determine that the first UE capability information indicates the incomplete capability of the UE; or if it is determined that the release information is earlier than a set release, determine that the first UE capability information indicates a complete capability of the UE.

An apparatus provided in this embodiment determines, by determining release information carried in a handover request, whether first UE capability information indicates an incomplete capability of a UE; and when determining that a received UE capability is incomplete by using the release information, sends a capability enquiry request message to the UE, so as to acquire a complete capability of the UE, thereby implementing that after a handover is completed, a target base station that has acquired the complete capability of the UE does not need to acquire the capability of the UE again, so that signaling overheads are reduced, and a system burden is relieved; and a target base station that acquires the incomplete capability of the UE acquires the complete capability of the UE again, which ensures that the UE that is handed over to the target base station can work normally.

Figure 12:
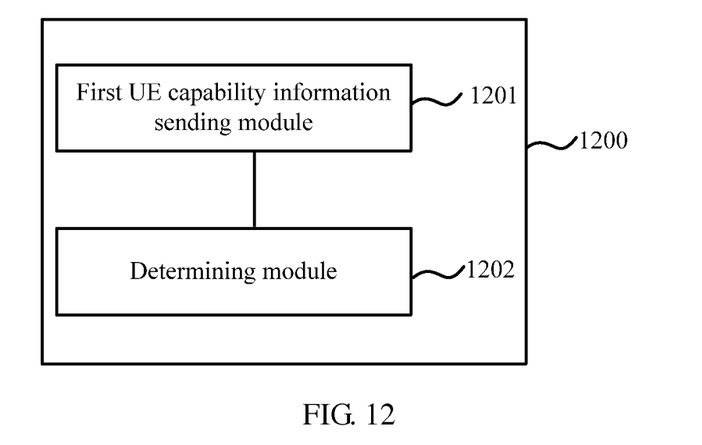
FIG. 12 is a schematic structural diagram of an apparatus 1200 for acquiring a UE capability according to Embodiment 12 of the present invention.

FIG. 12 is a schematic structural diagram of an apparatus for acquiring a UE capability according to Embodiment 12 of the present invention. The apparatus in this embodiment is applicable to a case in which, in a process of handing over a UE from a GERAN system to an LTE system, if the UE previously sends an incomplete capability of the UE to a core network device, after the UE is handed over to a target base station, the UE sends a complete capability of the UE to the target base station after receiving a capability enquiry request message sent by the target base station. The apparatus is generally implemented by using hardware and/or software. The apparatus 1200 in this embodiment includes the following modules: a first UE capability information sending module 1201 and a determining module 1202.

The first UE capability information sending module 1201 is configured to send the first UE capability information to the core network device, and the determining module 1202 is configured to: if the first UE capability information indicates the incomplete capability of the UE, after the UE is handed over to the target base station, receive a capability enquiry request message sent by the target base station. The first UE capability information sending module 1201 is further configured to: if the first UE capability information indicates the incomplete capability of the UE, after the UE is handed over to the target base station, the UE sends second UE capability information to the target base station, where the second UE capability information indicates the complete capability of the UE. The first UE capability information is carried in an Attach Request or a Routing Area Update Request sent by the UE to the core network device, or the first UE capability information is carried in Attach Complete or Routing Area Update Complete sent by the UE to the core network device. The first UE capability information sending module 1201 is further configured to: if the first UE capability information indicates the incomplete capability of the UE, after the UE is handed over to the target base station, send the second UE capability information to the target base station, where the second UE capability information indicates the complete capability of the UE.

After being handed over to a target base station, if the apparatus provided in this embodiment receives a capability enquiry request message sent by the target base station, the apparatus sends second UE capability information that indicates a complete capability of a UE to the target base station, thereby implementing that after a handover is completed, a UE that has sent a complete capability of the UE does not need to send the capability of the UE to the target base station again, so that signaling overheads are reduced and a system burden is relieved; and a UE that has sent an incomplete capability of the UE sends a complete capability of the UE to the target base station again, which ensures that the UE that is handed over to the target base station can work normally. The apparatus in this embodiment may be a UE.

On a basis of the foregoing Embodiment 12, further, the first UE capability information is carried in the Attach Request or the Routing Area Update Request sent by the UE to the core network device, or the first UE capability information is carried in the Attach Complete or the Routing Area Update Complete sent by the UE to the core network device. The first UE capability information may include indication information, and the indication information is used to indicate whether the first UE capability information indicates the incomplete capability of the UE; or the first UE capability information may carry third indication information, and the third indication information is used to indicate whether the first UE capability information indicates the incomplete capability of the UE. The first UE capability information sending module 1201 is further configured to send, to the target base station, second indication information that is used to indicate whether the first UE capability information indicates the incomplete capability of the UE, and the second indication information is carried in a handover complete message or a random access request message that is sent by the UE and received by the target base station.

Persons of ordinary skill in the art may understand that all or some of the steps of the method embodiments may be implemented by a program instructing relevant hardware. The program may be stored in a computer-readable storage medium. When the program executes, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for acquiring a user equipment (UE) capability of a UE, the method comprising:
   receiving, by a first base station, first UE capability information from a second base station, wherein the first base station is a target base station to which the UE is handed over, and the second base station is a source base station from which the UE is handed over; and
   when the first UE capability information indicates that the received first UE capability information is incomplete, and when the first base station does not already have complete capability information of the UE, acquiring, by the first base station, the complete capability information of the UE after the UE is handed over to the first base station.

2. The method according to claim 1, wherein the first UE capability information is carried in a handover request from the second base station.

3. The method according to claim 2, wherein the handover request carries release information of the UE and after the first base station receives the handover request from the second base station, the method further comprising determining, by the second base station, according to the release information, whether the received first UE capability information is incomplete.

4. The method according to claim 3, wherein after the first base station receives the handover request from the second base station, the method further comprises:
   receiving, by the first base station, second UE indication information from the UE, wherein the second UE indication information indicates whether the received first UE capability information is incomplete.

5. A method for acquiring a user equipment (UE) capability, comprising:
   sending, by a UE, first UE capability information to a core network device; and
   when the first UE capability information indicates that the first UE capability information is incomplete, receiving, by the UE, a message to require a complete capability of the UE sent from a first base station, after the UE is handed over to the first base station, wherein the first base station is a target base station to which the UE is handed over.

6. The method according to claim 5, wherein the first UE capability information comprises indication information that is used to indicate whether the first UE capability information is incomplete.

7. The method according to claim 6, further comprising:
   sending, by the UE to the first base station, second indication information that is used to indicate whether the first UE capability information is incomplete, wherein the second indication information is carried in a handover complete message or a random access request message that is sent by the UE and received by the first base station.

8. A base station, comprising:
   a receiver, configured to receive first user equipment (UE) capability information of a UE from a core network device; and
   a processor, configured to, when the first UE capability information indicates that the first UE capability information is incomplete, and when the base station does not already have complete capability information of the UE, acquire the complete capability of the UE after the UE is handed over to the base station, wherein the base station is a target base station to which the UE is handed over.

9. The base station according to claim 8, wherein the first UE capability information is carried in a handover request from the core network device or a second base station and received by the base station, wherein the second base station is a source base station from which the UE is handed over.

10. The base station according to claim 9, wherein the handover request carries first indication information that is used to indicate whether the first UE capability information is not complete.

11. The base station according to claim 8, wherein the first UE capability information comprises indication information that is used to indicate whether the first UE capability information is not complete.

12. The base station according to claim 8, wherein the receiver is further configured to receive second indication information from the UE and used to indicate whether the first UE capability information is not complete, the second indication information being carried in a received handover complete message or a received random access request message from the UE.

13. User equipment (UE), comprising:
   a transmitter, configured to send first UE capability information to a core network device; and
   a receiver, configured to, when the first UE capability information indicates the first UE capability information is not complete, receive a message to require a complete capability of the UE from a first base station after the UE is handed over to the first base station, wherein the first base station is a target base station to which the UE is handed over.

14. The UE according to claim 13, wherein the first UE capability information comprises indication information, wherein the indication information is used to indicate whether the first UE capability information is not complete and that additional capability is available for the UE.

15. The UE according to claim 13, wherein the transmitter is further configured to send, to the first base station, second indication information that is used to indicate whether the first UE capability information is not complete and that additional capability is available for the UE, the second indication information being carried in a handover complete message or a random access request message that is sent by the UE and received by the first base station.

16. The method according to claim 1, further comprising: when the first UE capability information indicates that the first UE capability information is incomplete and when the first base station already has the complete capability information of the UE, the first base station uses the first UE capability information.

17. The base station according to claim 8, wherein: when the first UE capability information indicates that the first UE capability information is incomplete and when the base station already has the complete capability information of the UE, the processor is further configured to use the first UE capability information.

* * * * *